United States Patent
Tin

(10) Patent No.: US 8,019,154 B2
(45) Date of Patent: Sep. 13, 2011

(54) NUMERICALLY ROBUST IMPLEMENTATION OF SPECTRAL GAMUT MAPPING

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 486 days.

(21) Appl. No.: 12/260,916

(22) Filed: Oct. 29, 2008

(65) Prior Publication Data

US 2010/0104179 A1   Apr. 29, 2010

(51) Int. Cl.
*G06K 9/00* (2006.01)

(52) U.S. Cl. ......... 382/167; 382/162; 358/1.9; 358/518; 358/523

(58) Field of Classification Search .................. 382/162, 382/167; 345/589, 590, 604, 605; 358/1.9, 358/535, 518, 523; 348/453
See application file for complete search history.

(56) References Cited

U.S. PATENT DOCUMENTS

| | | | |
|---|---|---|---|
| 6,698,860 B2 | 3/2004 | Berns et al. | 347/15 |
| 6,778,300 B1 * | 8/2004 | Kohler | 358/529 |
| 2006/0285742 A1 | 12/2006 | Arai et al. | 382/162 |
| 2007/0121132 A1 * | 5/2007 | Blinn et al. | 358/1.9 |
| 2007/0146383 A1 * | 6/2007 | Bayramoglu | 345/589 |

OTHER PUBLICATIONS

Derhak, Maxim W. and Rosen, Mitchell R., *Spectral Colorimetry Using LabPQR-An Interim Connection Space*, Proc. 12th CIC, pp. 246-250 (2004).
Rosen, Mitchell R. and Derhak, Maxim W., *Spectral Gamuts and Spectral Gamut Mapping*, Proc. SPIE, 6062 (2006).
Rosen, Mitchell R. and Ohta, Noboru, *Spectral Color Processing using an Interim Connection Space*, Proc. 11th CIC, pp. 187-192 (2003).
Tsutsumi, Shohei, Rosen, Mitchell R. and Berns, Roy S., *Spectral Reproduction using LabPQR: Inverting the Fractional-Area-Coverage-to-Spectra Relationship*, Proc. ICIS'06, pp. 107-110 (2006).

* cited by examiner

*Primary Examiner* — Samir A Ahmed
*Assistant Examiner* — Ali Bayat
(74) *Attorney, Agent, or Firm* — Fitzpatrick, Cella, Harper & Scinto

(57) ABSTRACT

Color management in which gamut mapping is performed in a spectral color space. The gamut mapping process includes a colorimetric gamut mapping step, in which a colorimetric projection of the source-side color is gamut-mapped into a colorimetric projection of the destination side's spectral gamut. To ensure that the resulting gamut-mapped colorimetric color can be inverted into a set of feasible points in the spectral gamut, an additional step is inserted into the gamut-mapping process. Specifically, a further projection is made of the gamut-mapped colorimetric projection, whereby the colorimetric color is projected onto within the numerical boundary of the colorimetric projection of the destination side's spectral gamut. This additional projection yields a numerically robust color space color, that largely avoids adverse effects that otherwise might be caused by "numerical voids" found in the floating point representation of numbers by digital computers.

30 Claims, 11 Drawing Sheets

NUMERICALLY ROBUST IMPLEMENTATION OF SPECTRAL GAMUT MAPPING

BACKGROUND

1. Field

The present invention concerns spectrally-based gamut mapping, namely, gamut mapping in a spectral color space.

2. Description of the Related Art

Color management systems are software-based systems that provide control over the color conversion of a color image from one device to another, such as from an image scanner or digital camera to a color printer or color monitor. One goal of color management is to retain good color fidelity when the color image is reproduced across a wide variety of different color devices, such that the reproduction of a color image will be perceived as a good match to the original color image even when reproduced on another device.

In a traditional color management system (CMS), color conversion is performed in a calorimetric color space, such as a CIEXYZ color space, or a color appearance space, such as a CIEJCh color space. Such color spaces are typified by their dimensionality, in that calorimetric and color appearance color spaces have three dimensions. Hereinafter, both calorimetric and color appearance color spaces will be referred to generically as "three dimensional color spaces".

More recently, CMSs have been developed which work in spectral color spaces. Spectral color spaces are advantageous over calorimetric color spaces, in that spectral color spaces include far more information concerning the fundamental nature of the underlying color. Spectral color spaces are typified by high dimensionality. For example, a space of spectral reflectance has 31 dimensions, each corresponding to a different measurement of the physical stimuli's reflectance at each 10 mm interval in the visible light range of 400 to 700 nm. More compact forms of spectral color spaces have been proposed, and several researchers have proposed spectral color spaces with as few as six dimensions. Even at six dimensions, however, such dimensionality adds geometrically more complexity to the work performed by spectral CMSs as opposed to calorimetric CMSs.

SUMMARY

Because CMSs are software-based systems, they must also deal with the reality of floating point calculations as performed in a digital computer. As background, most digital computers adhere to the floating point standards defined by IEEE-754, which defines the bit-format of floating point numbers, and the arithmetic operations performed on such floating point numbers, as used in a digital computer. As one example under the IEEE-754 standard, a floating point number is represented by 32 binary digits of information, which means that there is a capability of representing, at most, $2^{32}=4.3\times10^9$ different floating point numbers. Although this number is large, it is actually small when considered against the fact that there are an infinite number of different floating point numbers in the real number system. Thus, although a 32 bit floating point number can represent $4.3\times10^9$ real numbers exactly, there is a correspondingly infinite number of real numbers that have no exact representation at all. In a digital computer, the best that can be done for such numbers is to assign a closest one of the numbers that actually can be represented exactly. However, this introduces numerical inaccuracy, since the assigned bit pattern is only close and is not exact. As used herein, real numbers for which there is no exact floating bit pattern are referred to as "numerical voids".

In the context of a spectrally-based CMS, such numerical voids can lead to difficulties, particularly in the step of gamut mapping when gamut mapping is performed in a spectral color space. Spectral gamut mapping is often carried out in an interim connection space (ICS), which is a spectral color space specifically designed for efficient representation of spectral information. In designing a suitable ICS, it is common to select three of the dimensions so as to mimic ordinary three-dimensional color space behavior. If the ICS is a six-dimensional space, then the remaining three dimensions are used to capture spectral information that is not captured by the three-dimensional color space. Such a design often simplifies gamut mapping, and additionally provides the color scientist with some intuitive insights into the nature of the spectral gamut mapping being performed. On the other hand, a spectral space of relatively high dimension, such as a 31-dimensional space of spectral reflectance, may also be used directly. Equivalently, the ICS may be chosen to be the space of spectral reflectance itself.

When using such an ICS for spectral gamut mapping, the existence of numerical voids can cause difficulties, and can sometimes lead to numerically unstable results. In more detail, an ICS for spectral gamut mapping is often used as set out in the following steps. A first step is a projection of a spectrally-defined color from the high-dimensionality ICS onto a three-dimensional color space. A next step is a gamut mapping of the projected color into a projection of a spectrally-defined gamut onto the color space. A third step is determination of the set of feasible solutions for the gamut-mapped color space color, in the spectral ICS, by inverting the projection. This is equivalent to solving a set of underdetermined equations, so as to invert the projection. A final step is choosing a solution from the feasible set based on some predetermined criterion.

When determining the set of feasible solutions, however, and particularly when inverting the projection, the existence of numerical voids, and other limitations on numerical accuracy of floating point arithmetic in a digital computer, often yield numerically unstable results, especially at portions near to the boundary of the projected gamut of the three-dimensional color space (i.e., the color space gamut).

Such a situation is illustrated diagrammatically in FIGS. 1, 2 and 3. FIG. 1 shows a high-dimensional ICS (such as a six-dimensional ICS) being "projected" onto a three-dimensional color space. Naturally, it is not possible to illustrate the projection of a six-dimensional space onto a three-dimensional space, and what is depicted in FIG. 1 therefore only suggests such a projection, by projecting a three-dimensional space (e.g., spectral gamut 10) onto a two-dimensional space (e.g., color space 11). If the ICS has the first three components corresponding to the three-dimensional color space 11, then the generalized projection is a true projection onto the first three components. In general, if the ICS does not have the first three components corresponding to the three-dimensional color space 11, or if the ICS is the 31-dimensional space of spectral reflectance itself, then the generalized projection is the transformation of spectral reflectance to CIEXYZ or a related color space. FIG. 2 shows the resulting projection (e.g., color space gamut 12) and FIG. 3 shows a close-up of the illustrated area 13 of FIG. 2. As seen in FIG. 3, the true geometric boundary 14 of the spectral gamut projected onto the three-dimensional color space 11, as calculated mathematically and not in the floating point representation of a digital computer, is a smooth boundary, as expected. On the other hand, because of the limitations in floating point arithmetic, and the presence of numerical voids, there is a "numerical boundary" 15 which appears to be highly erratic, and is seen to include random fluctuations away from the true geometric boundary.

Such fluctuations are caused by numerical voids, in which a solution for gamut mapping exists theoretically, but cannot be calculated numerically because of errors introduced by floating point arithmetic in a digital computer.

According to one example embodiment described herein, an extra step is inserted into the process for spectral gamut mapping. In this step, after calorimetric gamut mapping of a color space color into a color space gamut (e.g., 12) that has been projected onto a three-dimensional color space (e.g., 11) from a spectral gamut (e.g., 10), the gamut-mapped color space color is projected onto within a numerical boundary (e.g., 15) of the color space gamut. In one example embodiment, such a projection may be performed as a radial contraction, in which the gamut-mapped color space color is contracted into within the numerical boundary in a direction toward a center of the projected color space gamut.

By virtue of the foregoing arrangement, in which the gamut-mapped color space color is projected onto a numerical boundary of the color space gamut, it is possible to obtain a numerically-stable color space color. Stated another way, the projection of the gamut-mapped color space color onto the numerical boundary of the color space gamut yields a color space color that is numerically stable, in the sense that it can be determined, with certainty, whether the color can or can not be inverted into a set of feasible points in the spectral gamut. Even more precisely, after calorimetric gamut mapping of a color space color into a color space gamut, the resulting gamut-mapped color space should have been brought into the calorimetric boundary of the destination device. The existence of numerical voids, however, raises the possibility that a color that ideally should be inside the color space gamut is actually not inside it numerically. However, according to the extra step inserted by embodiments described herein, whereby the gamut-mapped color space color is projected onto within a numerical boundary of the color space gamut, it is possible to ensure that the gamut-mapped color space color is indeed inside (or on the boundary of) the color space gamut, numerically. As such, and since the gamut-mapped color space color has been projected onto within a numerical boundary of the color space gamut, it is possible to determine with certainty whether the color can or can not be inverted into a set of feasible points in the spectral gamut. It is therefore possible to ensure that a set of feasible points can be determined numerically, particularly in those situations where gamut mappings exist theoretically but might not otherwise be obtainable numerically because of the existence of numerical voids.

Thus, in one example embodiment, a color management system converts a source color in a source device color space into a corresponding destination color in a destination device color space. The source color in the source device dependent color space is transformed through a transformation sequence into a spectrally-based interim connection space (ICS), so as to obtain a source-side color in the spectrally-based ICS. The source-side color is spectrally gamut-mapped so as to obtain a destination-side color in the spectrally-based ICS, and then the destination-side color is transformed through a transformation sequence into the corresponding destination color in the destination device-dependent color space. The spectral gamut mapping of the source-side color proceeds as follows, and utilizes a projection of a spectral gamut onto a three-dimensional color space so as to obtain a color space gamut thereof. First, the source-side color is projected onto the three-dimensional color space so as to obtain a projected source-side color. Next, the projected source-side color is calorimetrically gamut mapped using the color space gamut so as to obtain a gamut-mapped color space color. Next, the gamut-mapped color space color is projected onto within a numerical boundary of the color space gamut so as to obtain a numerically stable color space color. The numerically stable color space color is inverted so as to obtain a set of feasible points in the spectral gamut, wherein the set of feasible points in the spectral gamut includes one or more destination-side colors in the spectrally-based ICS that lie inside the spectral gamut and that project to the numerically-stable color space color. Finally, one destination-side color is chosen from among the one or more destination-side colors in the set of feasible points.

In example embodiments, in order to project the gamut-mapped color space color onto within a numerical boundary of the color space gamut so as to obtain a numerically stable color space color, a radial contraction is used, in which the gamut-mapped color space color is contracted into within the numerical boundary in a direction toward a center of the projected color space gamut.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION

Figure 1:
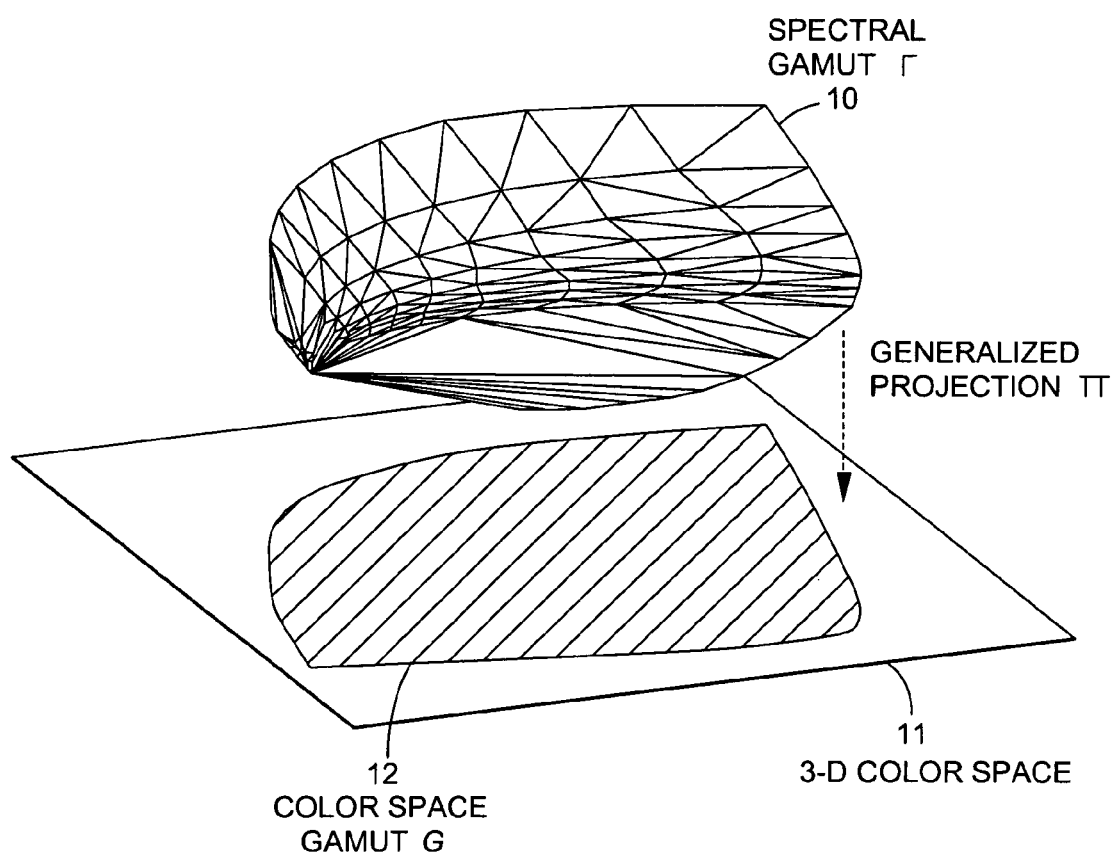
FIG. 1 shows a spectral gamut in a high-dimensional ICS being projected onto a three-dimensional color space.
Figure 2:
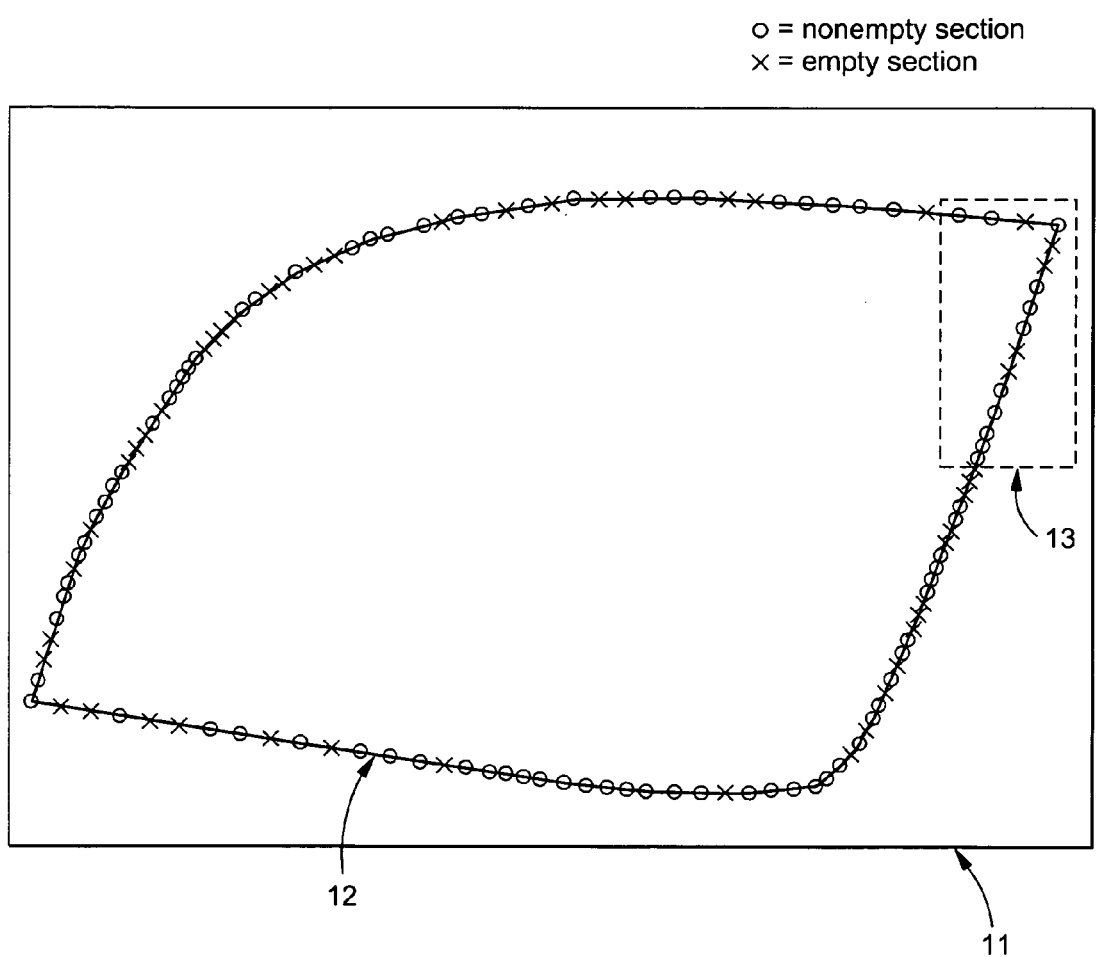
FIG. 2 shows the projection of FIG. 1 in more detail.
Figure 3:
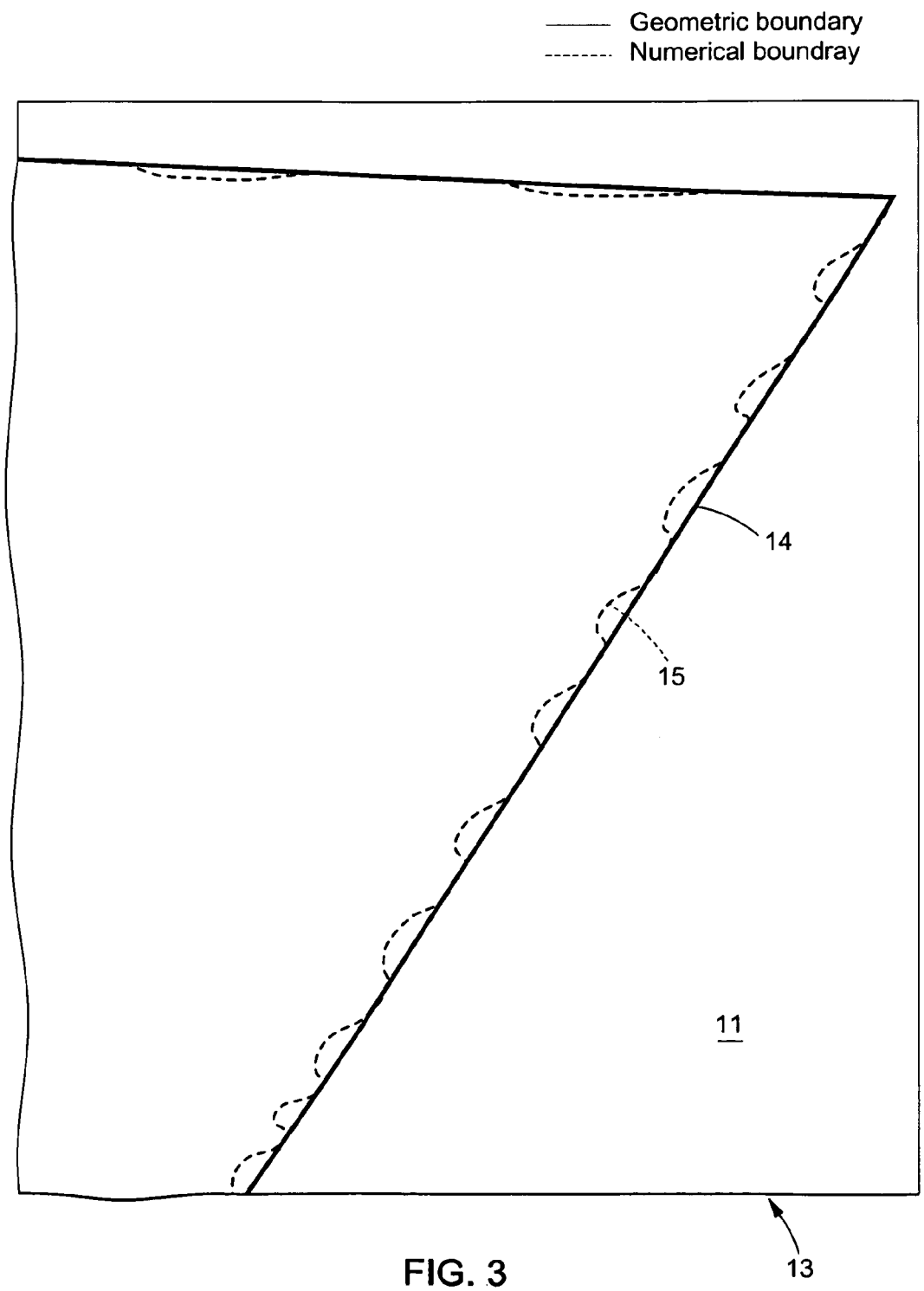
FIG. 3 shows a close-up of an illustrated area of FIG. 2.
Figure 4:
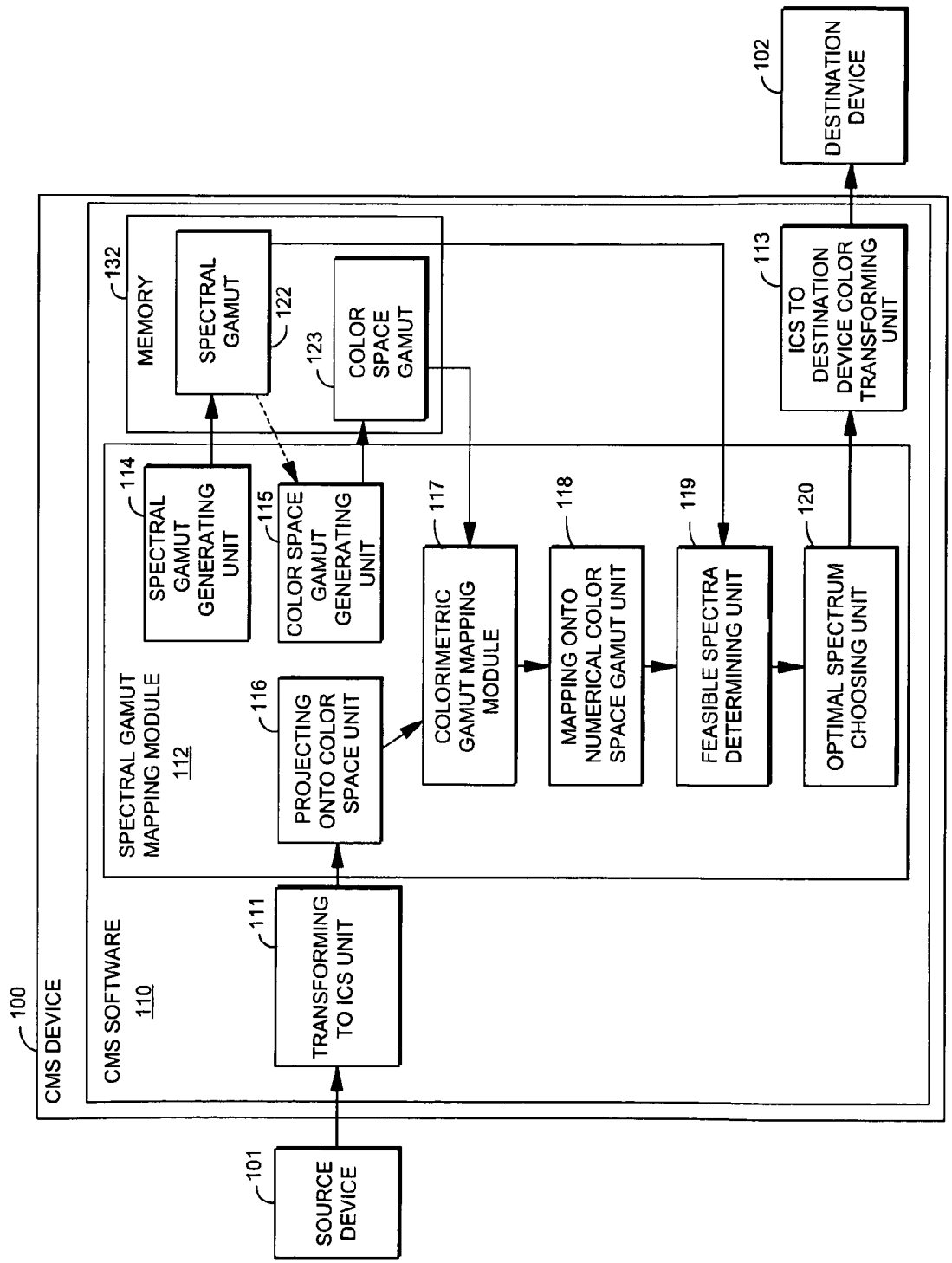
FIG. 4 depicts a color management system (CMS) device interacting with both a source device and a destination device, in accordance with an example embodiment.

FIG. 4 depicts a CMS device 100 interacting with both a source device 101 and a destination device 102, in accordance with an example embodiment. Source device 101 can be, for example, an image scanner, a digital camera or the like, and destination device 102 can be, for example, a color printer, a color monitor, or the like. As shown in FIG. 4, CMS device 100 is communicatively coupled with both source device 101 and destination device 102.

In the example embodiment, CMS device 100 is a general purpose computer that includes a software-based color management system (CMS) 110. The CMS software 110 includes program code for a color management process for converting a source color in a source device color space into a corresponding destination color in a destination device color space. The CMS software 110 is, for example, a system service on an operating system. CMS software 110 can be implemented as a separate DLL, as part of a device driver such as a scanner or printer driver, as a stand-alone program, or as an integral part of the operating system itself, or the like.

CMS software 110 includes program units that interact with each other to perform color management. In the example embodiment, these program units include transforming to ICS unit 111, spectral gamut mapping module 112, and ICS to destination device color transforming unit 113. Spectral gamut mapping module 112 includes spectral gamut generating unit 114, color space gamut generating unit 115, projecting onto color space unit 116, colorimetric gamut mapping module 117, mapping onto numerical color space gamut unit 118, feasible spectra determining unit 119, and optimal spectrum choosing unit 120. Spectral gamut 122 generated by the spectral gamut generating unit 114, and color space gamut 123 generated by the color space gamut generating unit 115 are stored in system memory 132. In addition, spectral gamut 122 and/or color space gamut 123 can also be loaded into system memory 132 from storage device 136 or other computer readable medium as a result of caching from a previous invocation of spectral gamut generating unit 114 and color space gamut generating unit 115. The operation of each of these units and modules included in CMS software 110 will be described below in the description of FIGS. 6, 7, 8 and 10.

In the example embodiment, source colors are generated by source device 101 and stored on a computer-readable medium included in source device 101. CMS device 100 reads the source colors from the computer-readable medium included in source device 101, and executes the program code for CMS software 110, which converts the source colors to destination colors. CMS device 100 transfers the converted destination colors to destination device 102, which outputs the converted destination colors.

In other example embodiments, CMS device 100 may or may not be communicatively coupled to both source device 101 and destination device 102. In other example embodiments in which CMS device 100 is not communicatively coupled to source device 101, the source colors are generated by source device 101 and stored on a removable computer-readable medium included in source device 101. The removable computer-readable medium is removed from source device 101 and communicatively coupled to CMS device 100, CMS device 100 reads the source colors from the removable computer-readable medium, and CMS device 100 executes the program code for CMS software 110, which converts the source colors to destination colors.

In other example embodiments in which CMS 100 is not communicatively coupled to destination device 102, instead of transferring the converted destination colors to destination device 102, CMS device 100 stores the converted destination colors on a computer readable medium.

Figure 5:
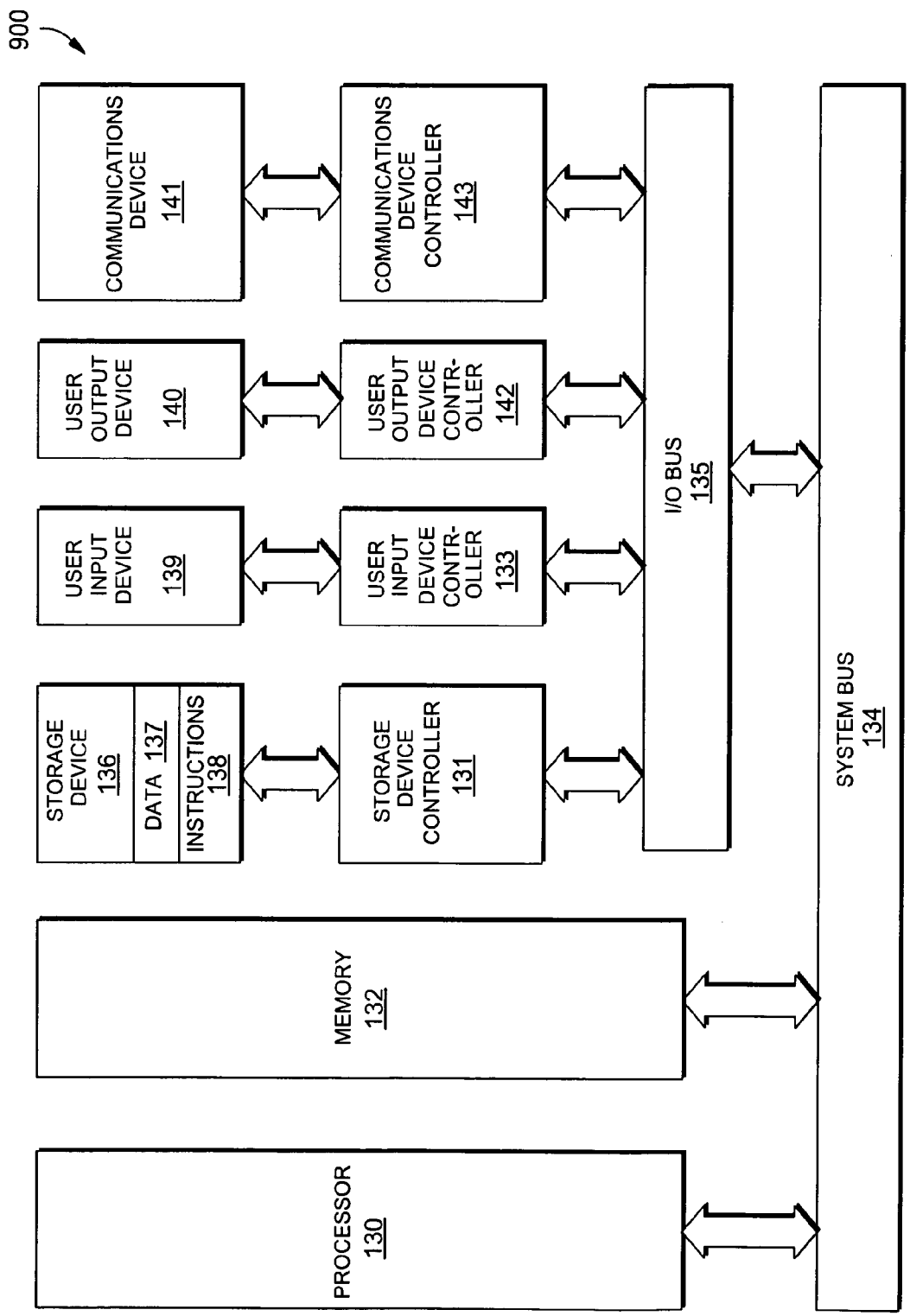
FIG. 5 is an architecture diagram of the CMS device of FIG. 4.

FIG. 5 is an architecture diagram of CMS device 100. CMS device 100 includes a processor 130 coupled to a memory 132 via system bus 134. The processor is also coupled to external Input/Output (I/O) devices via the system bus and an I/O bus 135. A storage device having computer-readable media 136 is coupled to the processor via a storage device controller 131 and the I/O bus and the system bus. The storage device is used by the processor to store and read data 137 and program instructions 138.

Program instructions 138 include, for example, CMS software 110, transforming to ICS unit 111, spectral gamut mapping module 112, ICS to destination device color transforming unit 113, spectral gamut generating unit 114, color space gamut generating unit 115, projecting onto color space unit 116, calorimetric gamut mapping module 117, mapping onto numerical color space gamut unit 118, feasible spectra determining unit 119, and optimal spectrum choosing unit 120. Data 137 includes, for example source colors, converted destination colors, and spectral measurement data for the source and destination devices. Memory 132, in addition to holding loaded program instructions and data from the storage device 136, can also hold, for example pre-computed color space gamuts 123, and pre-computed spectral gamuts 122 obtained during the initialization of an end-to-end color transform.

The processor may be further coupled to a user output device 140 via a user output device controller 142 coupled to the I/O bus. The processor may be further coupled to a user input device 139 via a user input device controller 133 coupled to the I/O bus. The processor uses the user input device to allow a user to control the CMS device to receive source colors from source device 101, or to transfer converted destination colors to destination device 102.

The processor may be further coupled to a communications device 141 via a communications device controller 143 coupled to the I/O bus. The processor may use the communications device to communicate with source device 101 and destination device 102. Examples of devices that may be coupled to communications device 141 include printers, scanners, digital cameras, and digital video cameras. The processor may also use the communications device to receive program instructions and data from the Internet, or any other type of network.

In operation, the processor loads the program instructions from the storage device into the memory. The processor executes the loaded program instructions to implement the color management processes as described above.

Figure 6:
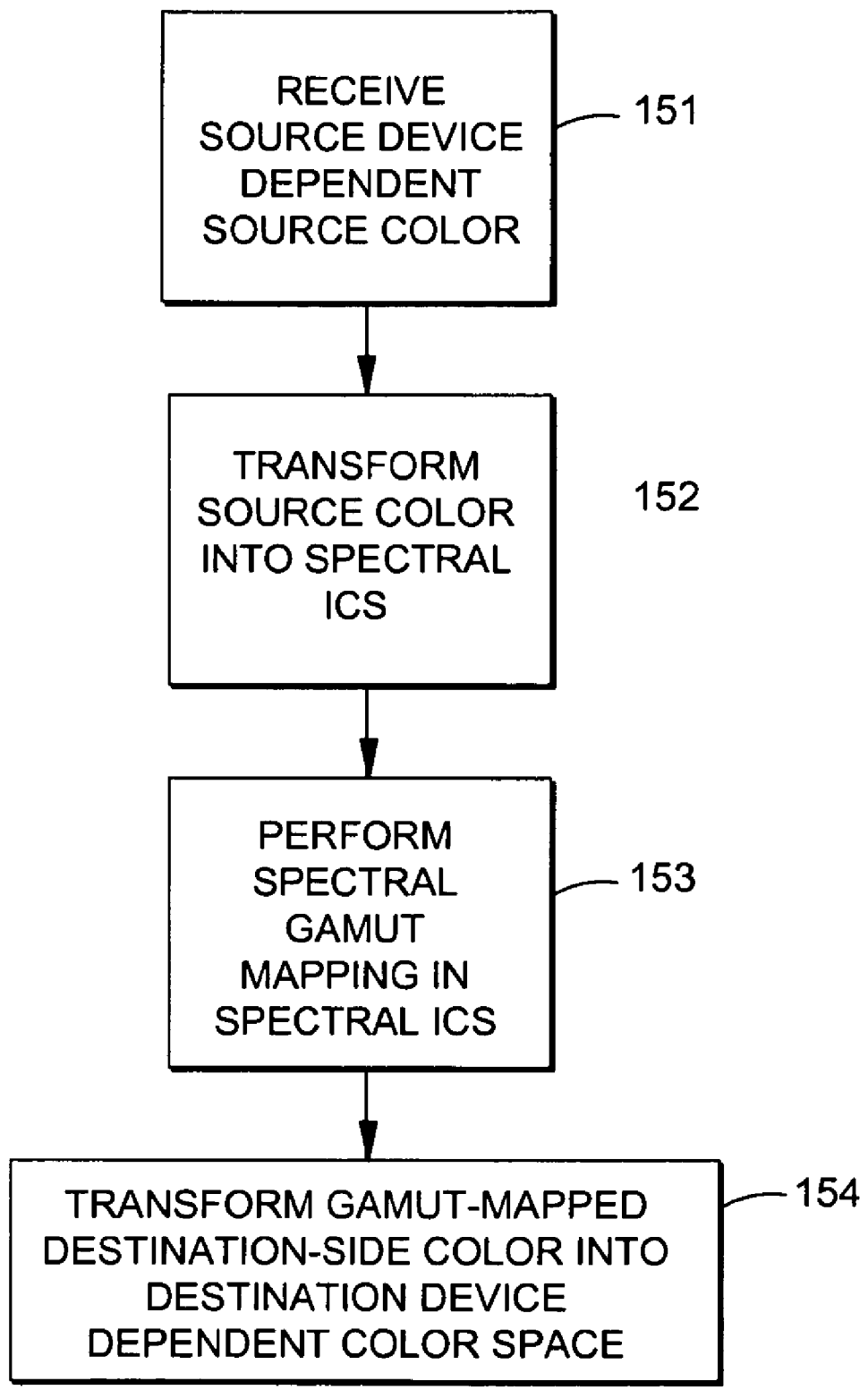
FIG. 6 is a flow diagram of the spectral color management process performed by the CMS device of FIG. 4.

FIG. 6 is a flow diagram of the color management process performed by CMS device 100. The process steps of FIG. 6 are stored on computer-executable software code on a computer-readable memory medium such as instructions 138 on storage device 136, and are executed by processor 130 in connection with CMS software 110. At step 151, CMS device 100 receives a source device dependent source color. In the example embodiment, CMS device 100 is communicatively coupled to source device 101, and CMS device 100 receives the source device dependent source color from source device 101. However, in other embodiments, CMS device 100 is not communicatively coupled to source device 101, and CMS device 100 receives the source device dependent source color by reading a computer-readable medium that stores the source device dependent source color. The source device dependent source color is in the color space of source device 101. At step 152, the transforming to ICS unit 111 performs a sequence of transformations to transform the source color into a spectrally-based interim connection space (ICS), so as to obtain a source-side color in the spectrally-based ICS. Such sequence may include a transformation of the source device color to spectral reflectance, followed by a transformation from spectral reflectance to ICS value. At step 153, spectral gamut mapping module 112 performs spectral gamut mapping in spectral ICS space to spectrally gamut-map the source-side color in the spectral ICS so as to obtain a gamut-mapped destination-side color in the spectrally-based ICS. This is explained in greater detail below, in connection with FIG. 7. At step 154, ICS to destination device color transforming unit 113 performs a sequence of transformations to transform the gamut-mapped destination-side color (which is in the spectrally-based ICS) into the corresponding destination color in the destination device dependent color space.

Such sequence may include a transformation of the ICS value to spectral reflectance, followed by a transformation from spectral reflectance to destination device color. In the example embodiment, destination device 102 is communicatively coupled to CMS device 100, CMS device 100 transfers the converted destination colors to destination device 102, and destination device 102 outputs the converted destination color. In other example embodiments, instead of transferring the converted destination color to destination device 102, CMS device 100 stores the converted destination color on a computer readable medium.

Figure 7:
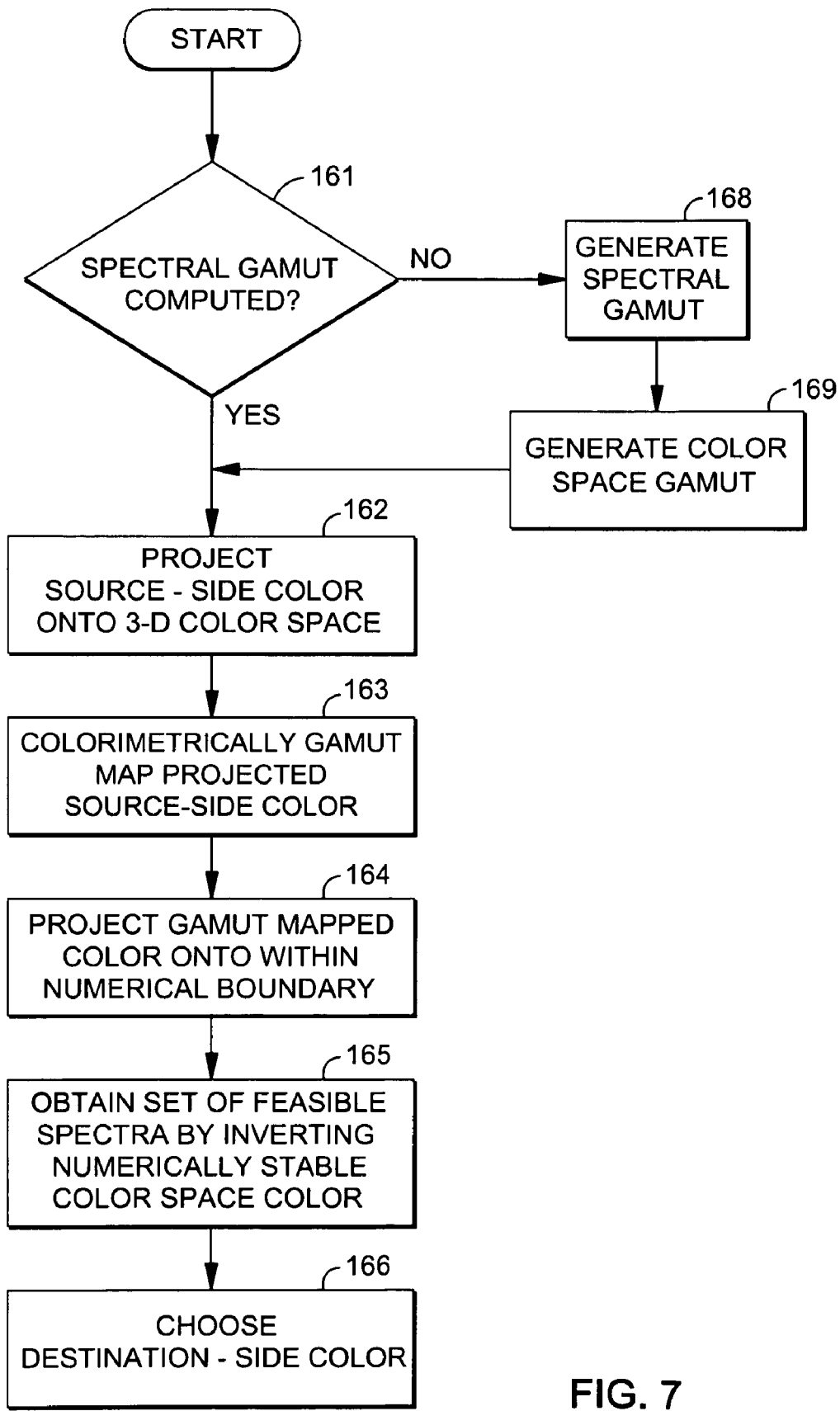
FIG. 7 is a flow diagram showing the spectral gamut mapping of FIG. 6 in more detail.

FIG. 7 is a flow diagram showing the spectral gamut mapping of step 153 in more detail. At step 161, CMS software 110 determines whether a spectral gamut has been pre-computed. If the spectral gamut has been pre-computed ("YES" at step 161), processing proceeds to step 162.

If the spectral gamut has not been pre-computed ("NO" at step 161), then processing proceeds to step 168, where spectral gamut generating unit 114 generates the spectral gamut for destination device 102, and stores the spectral gamut so that it can be re-used for conversion of multiple ones of source device dependent source colors into a corresponding number of destination device dependent destination colors. After the processing in step 168 has completed, processing proceeds to step 169.

At step 169, color space gamut generating unit 115 generates the color space gamut. In one embodiment, the color space gamut generating unit 115 receives points in the spectral gamut and projects them onto a three-dimensional color space so as to obtain the color space gamut thereof. The color space gamut is stored so that it can be re-used for conversion of multiple ones of source device dependent source colors into a corresponding number of destination device dependent destination colors, and thereafter, processing proceeds to step 162.

At step 162, projecting onto color space unit 116 projects the source-side color (in the spectral ICS) onto the three-dimensional color space so as to obtain a projected source-side color. At step 163, calorimetric gamut mapping module 117 performs a gamut mapping to calorimetrically gamut map the projected source-side color using the color space gamut so as to obtain a gamut-mapped color space color.

At step 164, mapping onto numerical color gamut unit 118 projects the gamut-mapped color onto within a numerical boundary of the color space gamut so as to obtain a numerically stable color space color. In the example embodiment, the projection is performed using a radial contraction process. A "center" c is first determined, such that the set of spectra that have colorimetry c and lie inside the spectral gamut $\Gamma$ (denoted by notation $\Gamma \cap c$) is nonempty. In the case that c is inside the interior of the color space gamut G, $\Gamma \cap c$ is likely to be nonempty. In the example embodiment, c is a "centroid", such that the location of c is "balanced" with respect to the color space gamut G. More specifically, in the example embodiment, G is a convex hull, and c is the average of the vertices of the convex hull. In other example embodiments, c is the average of a set of points (e.g., from measurements) that are known to span the color space gamut G. A point $P_0$ within the geometric color space gamut boundary is specified, and the radial contraction mapping for the point $P_0$ is constructed by determining the closest point Q to $P_0$ within the numerical boundary that lies on the radial vector connecting the center c to $P_0$. In the example embodiment, the closest point Q is determined by performing a binary search that is iterated until a required precision is reached, e.g., when the point Q is within a "machine epsilon" (EPS) to the numerical boundary. For example, for IEEE-754 single precision floating point numbers, EPS is approximately $1.192092896 \times 10^{-7}$. The mapping from $P_0$ to Q allows the rest of the spectral gamut mapping process to continue because $\Gamma \cap Q$ is guaranteed to be nonempty by construction of the radial contraction mapping.

In other embodiments, the projection of the gamut-mapped color onto within the numerical boundary of the color space gamut can be performed using another type of process besides a radial contraction process.

At step 165, feasible spectra determining unit 119 inverts the numerically stable color space color so as to obtain a set of feasible points in the spectral gamut, wherein the set of feasible points in the spectral gamut includes one or more destination-side colors in the spectrally-based ICS that lie inside the spectral gamut and that project to the numerically-stable color space color. The set of feasible spectra is also called a "gamut section". The gamut section is a geometric intersection of a linear subspace and a spectral gamut for the destination device.

At step 166, optimal spectrum choosing unit 120 chooses one destination-side color from among the one or more destination-side colors in the set of feasible points. The one destination-side color chosen from among the one or more destination-side colors corresponds to the destination-side color that minimizes an objective function.

Figure 8:
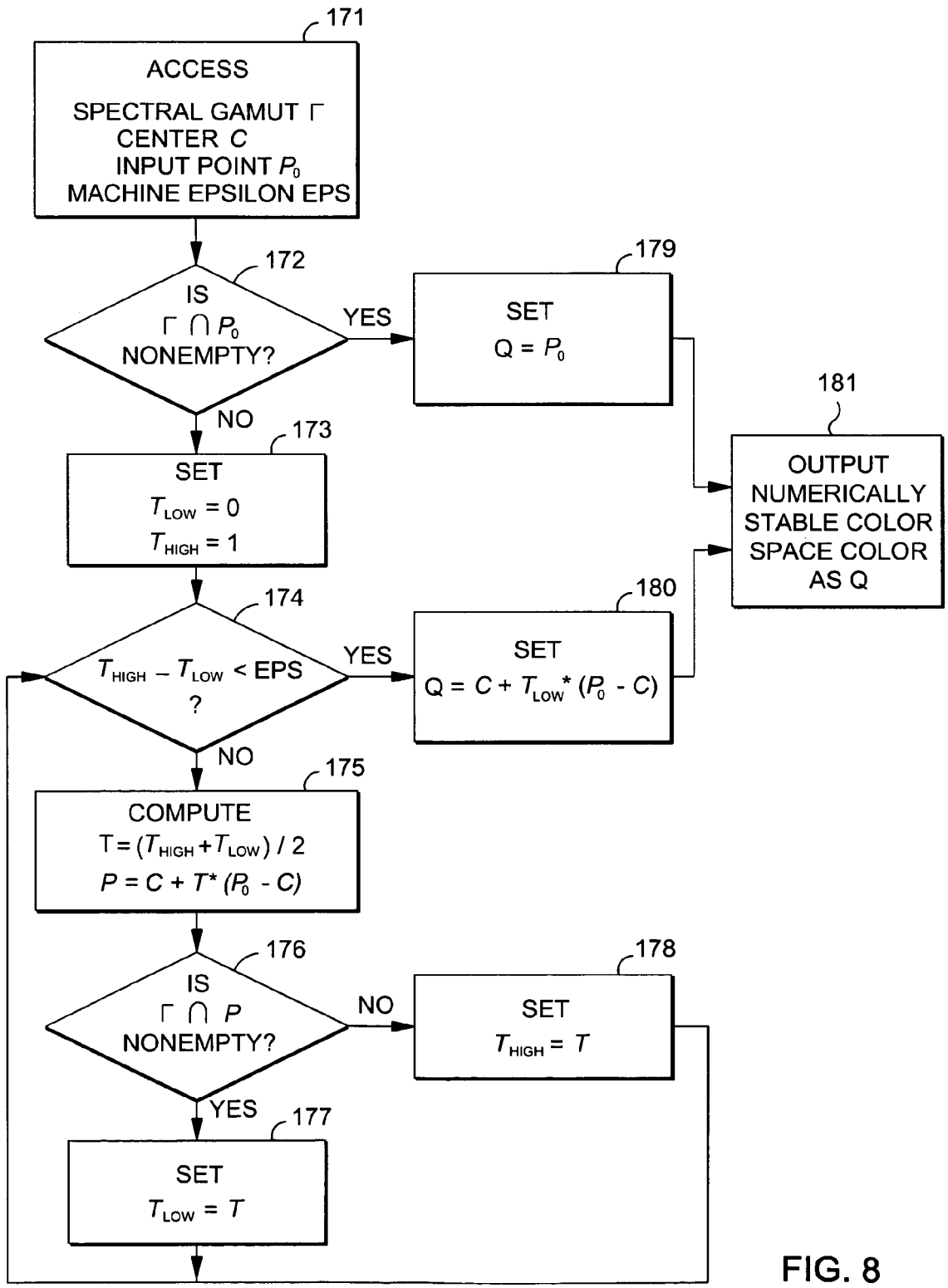
FIG. 8 is a flow diagram illustrating a radial contraction process, according to the example embodiment.

FIG. 8 is a flow diagram showing the projecting of step 164 in more detail. In the example embodiment, the projection is performed using a radial contraction process that uses a binary search. At step 171, a spectral gamut $\Gamma$ and a center c in a color space gamut are accessed. The center c has been determined prior to step 171, such that the set of spectra that have colorimetry c and lie inside the spectral gamut $\Gamma$ (denoted by notation $\Gamma \cap c$) is nonempty. In the case that c is inside the interior of the color space gamut G, $\Gamma \cap c$ is likely to be nonempty. In the example embodiment, c is a "centroid", such that the location of c is "balanced" with respect to the color space gamut G. In the example embodiment, G is a convex hull, and c is the average of the vertices of the convex hull. In other example embodiments, the c is the average of a set of points (e.g., from measurements) that are known to span the color space gamut G. At the same time, at step 171, a color space color $P_0$, and a "machine epsilon" (EPS) are specified.

At step 172, feasible spectra determining unit 119 determines whether the set of spectra that have colorimetry $P_0$ and lie inside the spectral gamut $\Gamma$ (i.e., $\Gamma \cdot P_0$) is nonempty.

If $\Gamma \cap P_0$ is nonempty ("YES" at step 172), processing proceeds to step 179. At step 179, the closest point Q to $P_0$ within the numerical boundary that lies on the radial vector connecting the center c to $P_0$ is set to $P_0$. In other words, $P_0$ is already in the numerical color space gamut. Thereafter, processing proceeds to step 181 where Q is output as the numerically stable color space color.

If $\Gamma \cap P_0$ is empty ("NO" at step 172), processing proceeds to step 173. At step 173, a low value ($T_{LOW}$) is set to 0 and a high value ($T_{HIGH}$) is set to 1. Thereafter, processing proceeds to step 174. At step 174, the difference between $T_{HIGH}$ and $T_{LOW}$ is compared with EPS. If $T_{HIGH}-T_{LOW}$ is less than EPS ("YES" at step 174), then processing proceeds to step 180. At step 180, the closest point Q to $P_0$ within the numerical boundary that lies on the radial vector connecting the center c to $P_0$ is set to $c+T_{LOW}*(P_0-c)$. Thereafter, processing proceeds to step 181 where Q is output as the numerical stable color space color.

If $T_{HIGH}-T_{LOW}$ is not less than EPS ("NO" at step 174), then processing proceeds to step 175. At step 175, T is computed to be $(T_{HIGH}+T_{LOW})/2$, and P is computed to be $c+T*(P_0-c)$. Thereafter, processing proceeds to step 176.

At step 176, feasible spectra determining unit 119 determines whether the set of spectra that have colorimetry P and lie inside the spectral gamut Γ (i.e., Γ ∩ P) is nonempty. If Γ ∩ P is nonempty ("YES" at step 176), processing proceeds to step 177. At step 177, $T_{LOW}$ is set to T. Thereafter, processing returns to step 174. If Γ ∩ P is empty ("NO" at step 176), processing proceeds to step 178. At step 178, $T_{HIGH}$ is set to T. Thereafter, processing returns to step 174.

Figure 9:
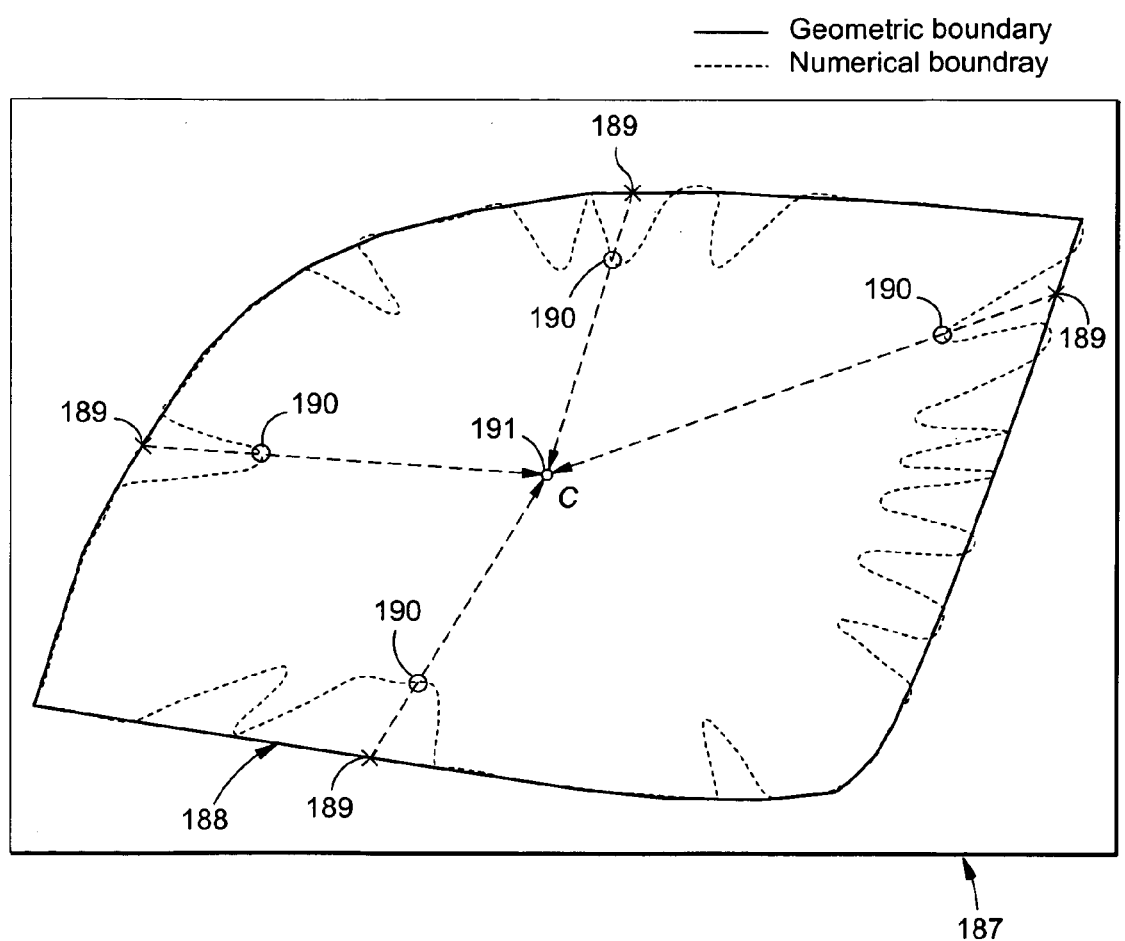
FIG. 9 shows a radial contraction mapping, according to the example embodiment.

FIG. 9 shows a radial contraction mapping, according to the example embodiment. FIG. 9 depicts color space gamut G 188 in a three-dimensional color space 187. Reference numerals 189 are points $P_0$ on the geometric boundary of gamut 188, and reference numerals 190 are points Q on the numerical boundary of gamut 188. Reference numeral 191 is the center c of gamut 188. In FIG. 9, the difference between the geometric boundary and the numerical boundary is exaggerated for purposes of illustration. In reality, the difference is within the order of the machine epsilon (EPS). Thus, the effect of the radial contraction mapping may be indiscernible to the human eye. However, the radial contraction mapping affects the feasible spectra determining unit's 119 determination of whether the set of spectra that have colorimetry P and lie inside the spectral gamut Γ (i.e., Γ ∩ P) is nonempty.

Figure 10:
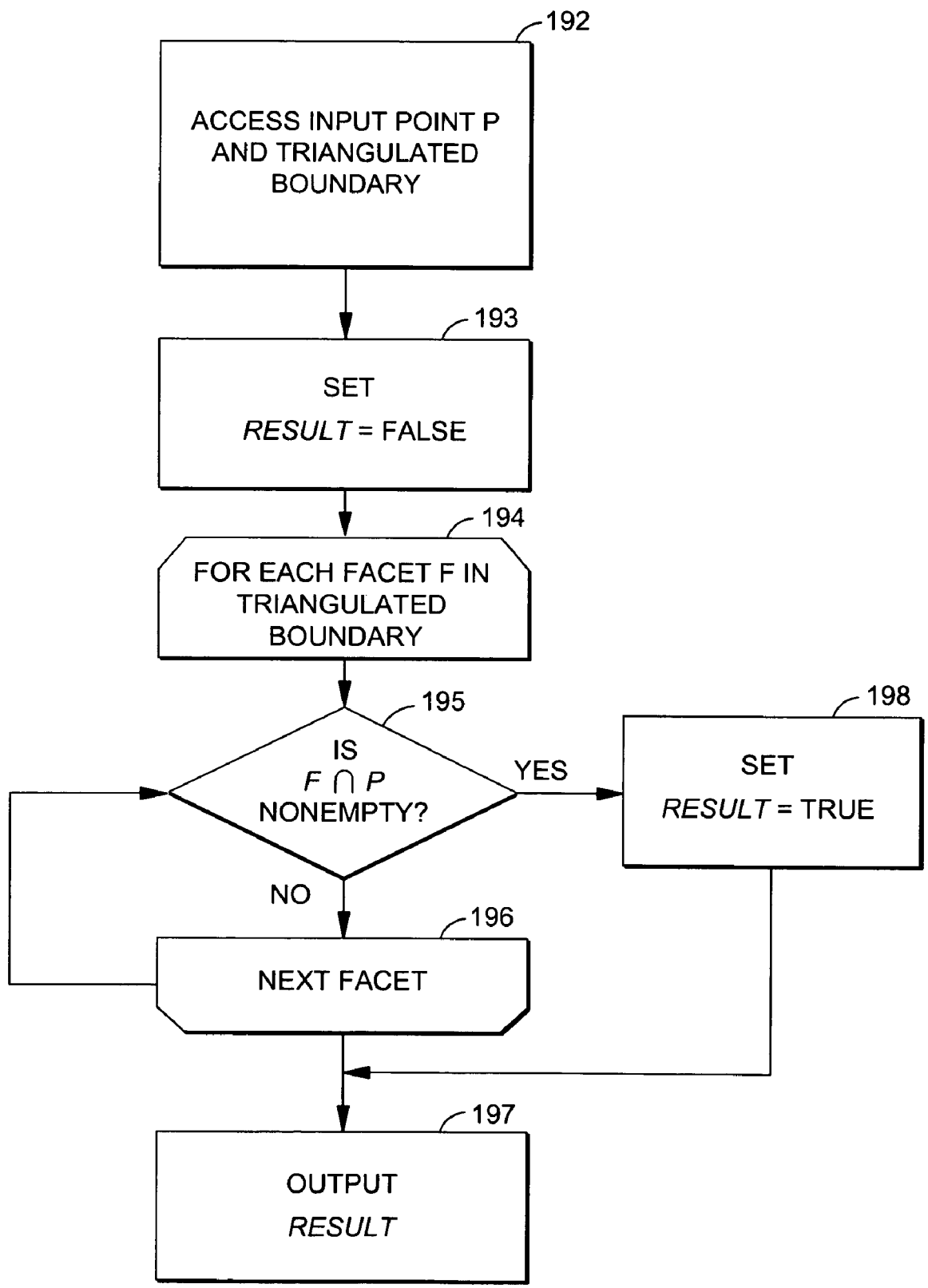
FIG. 10 is a flow diagram illustrating a process for determining whether a section is nonempty, according to the example embodiment.

FIG. 10 is a flow diagram illustrating a process for determining whether a gamut section is nonempty, according to an example embodiment wherein the boundary of the spectral gamut is triangulated. In the example embodiment, the spectral gamut is constructed as a convex hull, and the boundary of the spectral gamut is a collection of facets (or simplices). For a color space color x, to determine if the gamut section at x, i.e., the set of spectra that have colorimetry x and lie inside the spectral gamut Γ (i.e., Γ ∩ x), is nonempty or not, it is equivalent to determine if the boundary of the gamut section, denoted ∂(Γ ∩ x), is nonempty or not. This in turn can be determined by computing the intersection with each facet:

$$\partial(\Gamma \cap x) = \bigcup_{F \text{ is a facet of } \partial\Gamma} F \cap x = \bigcup_{F \text{ is a facet of } \partial\Gamma} F \cap \pi^{-1}(x) \quad \text{Equation (1)}$$

As shown in Equation (1), π is the "generalized projection" that projects the spectrally based ICS onto the three-dimensional color space. Furthermore, if the spectral gamut Γ is convex, and Γ ∩ x is also convex, then Γ ∩ x can further be computed/represented as the convex hull of points from $$\bigcup_{F \text{ is a factor of } \partial\Gamma} F \cap x.$$

The spectral gamut Γ and Γ ∩ x are both convex in the case where π is a linear transformation, such as the transformation from spectral reflectance to CIEXYZ under a predetermined illuminant. The spectral gamut Γ and Γ ∩ x are also both convex in the case where π is a composite transformation, which includes a linear transformation (such as the transformation from spectral reflectance to CIEXYZ under a predetermined illuminant) followed by a possibly nonlinear one-to-one mapping (such as the transformation from CIEXYZ to CIELAB).

Although the construction of ∂(Γ ∩ x) as a set theoretic union of all facet sections Γ ∩ x might be quite computationally demanding, especially if there are a large number of facets, a mapping onto within numerical boundary algorithm such as the one described in FIG. 8, only requires a determination of whether Γ ∩ x is nonempty or not. In particular, if a facet is encountered that has a nonempty section, then it can be concluded that ∂(Γ ∩ x), and therefore Γ ∩ x, is nonempty, without going through the rest of the facets. In other words, mapping onto within the numerical boundary depends on a much less computationally demanding method than a method to construct the gamut section Γ ∩ x. The process illustrated in FIG. 10 determines if a gamut section is nonempty or not in the case of a triangulated gamut boundary.

At step 192, the input point P, e.g., either P or $P_0$ of steps 176 and 172, respectively, of FIG. 8, is accessed, and the triangulated boundary of the spectral gamut is accessed. Thereafter, processing proceeds to step 193, where RESULT is set to FALSE. Thereafter, processing proceeds to step 194 where a facet F in the triangulated gamut boundary is selected. Thereafter, processing proceeds to step 195, where feasible spectra determining unit 119 determines whether the set of spectra that have colorimetry P and lie inside the facet F is nonempty.

If Γ ∩ P is nonempty ("YES" at step 195), processing proceeds to step 198, where RESULT is set to TRUE. Thereafter, processing proceeds to step 197 where RESULT is output. If Γ ∩ P is empty ("NO" at step 195), processing proceeds to step 196, where a next facet F is selected. Thereafter, processing returns to step 195.

By virtue of the foregoing arrangement, in which the gamut-mapped color space color is projected onto within a numerical boundary of the color space gamut, it is possible to obtain a numerically-stable color space color. Stated another way, the projection of the gamut-mapped color space color onto within the numerical boundary of the color space gamut yields a color space color that is numerically stable, in the sense that it can be determined, with certainty, whether the color can or can not be inverted into a set of feasible points in the spectral gamut. Even more precisely, after colorimetric gamut mapping of a color space color into a color space gamut, the resulting gamut-mapped color space should have been brought into within the color space gamut boundary of the destination device. The existence of numerical voids, however, raises the possibility that a color that ideally should be inside the color space gamut is actually not inside it numerically.

Figure 11:
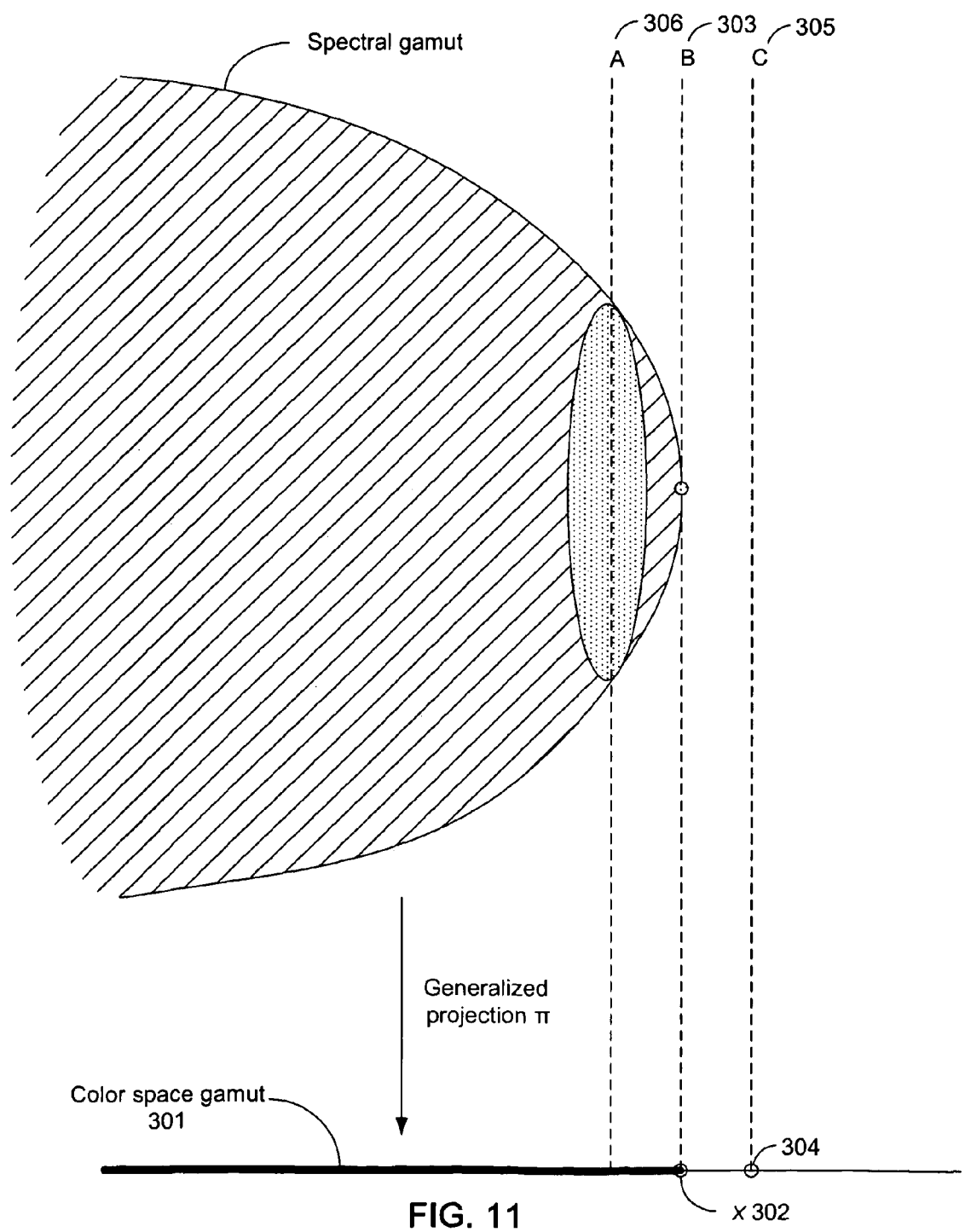
FIG. 11 illustrates the determination of feasible points in the spectral gamut.

For example, as shown in FIG. 11, color space color 302 ideally should be inside the color space gamut 301, and the inversion of point 302 should return a nonempty set of feasible points in the spectral gamut at section 303, which consists of one point. In practice, however, the numerical determination of point 302 on a finite precision computer may instead determine a numerical point 304, which, when inverted, results in an empty set 305.

However, according to the extra step inserted by embodiments described herein, the gamut-mapped color space color is projected onto within a numerical boundary of the color space gamut, which is the boundary of color space points that have a non-empty section, numerically. In this manner, it possible to ensure that the gamut-mapped color space color is indeed inside (or on the boundary of) the three-dimensional color space gamut, numerically. As such, and since the gamut-mapped color space color has been projected onto within a numerical boundary of the three-dimensional color space gamut, it is possible to determine with certainty whether the gamut-mapped color space color can or can not be inverted into a set of feasible points in the spectral gamut. It is therefore possible to ensure that a set of feasible points can be determined numerically, particularly in those situations where gamut mappings exist theoretically but might not otherwise be obtainable numerically because of the existence of numerical voids.

The exemplary embodiments of the invention have been described above with respect to particular illustrative embodiments, however, various changes and modifications may be made without departing from the scope of the invention. For example, in general, steps of methods described above may be performed in a different order and still achieve desirable results.

What is claimed is:

1. A color management method for converting a source color in a source device color space into a corresponding destination color in a destination device color space, comprising:
- transforming the source color in the source device dependent color space through a transformation sequence into a spectrally-based interim connection space (ICS), so as to obtain a source-side color in the spectrally-based ICS;
- spectrally gamut-mapping the source-side color so as to obtain a destination-side color in the spectrally-based ICS; and
- transforming the destination-side color through a transformation sequence into the corresponding destination color in the destination device-dependent color space;
- wherein said spectral gamut-mapping step comprises:
- first projecting a spectral gamut onto a three-dimensional color space so as to obtain a color space gamut thereof;
- second projecting the source-side color onto the three-dimensional color space so as to obtain a projected source-side color;
- colorimetrically gamut mapping the projected source-side color using the color space gamut so as to obtain a gamut-mapped color space color;
- third projecting the gamut-mapped color space color onto within a numerical boundary of the color space gamut so as to obtain a numerically stable color space color;
- inverting the numerically stable color space color so as to obtain a set of feasible points in the spectral gamut, wherein the set of feasible points in the spectral gamut includes one or more destination-side colors in the spectrally-based ICS that lie inside the spectral gamut and that project to the numerically-stable color space color; and
- choosing one destination-side color from among the one or more destination-side colors in the set of feasible points.

2. The color management method according to claim 1, wherein in said first projecting step, the color space gamut is pre-computed and is re-used for conversion of multiple ones of source colors into a corresponding number of destination colors.

3. The color management method according to claim 1, wherein in said inverting step, a gamut section is obtained, wherein the gamut section is defined as a geometric intersection of a linear subspace and a spectral gamut for the destination device.

4. The color management method according to claim 3, wherein the spectral gamut for the destination device is pre-computed and is re-used for conversion of multiple ones of source colors into a corresponding number of destination colors.

5. The color management method according to claim 1, wherein in said choosing step, the one destination-side color chosen from among the one or more destination-side colors corresponds to the destination-side color that minimizes an objective function.

6. The color management method according to claim 1, wherein said third projecting step comprises a radial contraction in which the gamut-mapped color space color is contracted into within the numerical boundary in a direction toward a center of the projected color space gamut.

7. A color management device for converting a source color in a source device color space into a corresponding destination color in a destination device color space, the device including a processor and a computer-readable memory medium that stores computer-executable code executed by the processor, the code including code for performing a color management method comprising:
- transforming the source color in the source device dependent color space through a transformation sequence into a spectrally-based interim connection space (ICS), so as to obtain a source-side color in the spectrally-based ICS;
- spectrally gamut-mapping the source-side color so as to obtain a destination-side color in the spectrally-based ICS; and
- transforming the destination-side color through a transformation sequence into the corresponding destination color in the destination device-dependent color space;
- wherein said spectral gamut-mapping step comprises:
- first projecting a spectral gamut onto a three-dimensional color space so as to obtain a color space gamut thereof;
- second projecting the source-side color onto the three-dimensional color space so as to obtain a projected source-side color;
- colorimetrically gamut mapping the projected source-side color using the color space gamut so as to obtain a gamut-mapped color space color;
- third projecting the gamut-mapped color space color onto within a numerical boundary of the color space gamut so as to obtain a numerically stable color space color;
- inverting the numerically stable color space color so as to obtain a set of feasible points in the spectral gamut, wherein the set of feasible points in the spectral gamut includes one or more destination-side colors in the spectrally-based ICS that lie inside the spectral gamut and that project to the numerically-stable color space color; and
- choosing one destination-side color from among the one or more destination-side colors in the set of feasible points.

8. The color management device according to claim 7, wherein in said first projecting step, the color space gamut is pre-computed and is re-used for conversion of multiple ones of source colors into a corresponding number of destination colors.

9. The color management device according to claim 7, wherein in said inverting step, a gamut section is obtained, wherein the gamut section is defined as a geometric intersection of a linear subspace and a spectral gamut for the destination device.

10. The color management device according to claim 9, wherein the spectral gamut for the destination device is pre-computed and is re-used for conversion of multiple ones of source colors into a corresponding number of destination colors.

11. The color management device according to claim 7, wherein in said choosing step, the one destination-side color chosen from among the one or more destination-side colors corresponds to the destination-side color that minimizes an objective function.

12. The color management device according to claim 7, wherein said third projecting step comprises a radial contraction in which the gamut-mapped color space color is contracted into within the numerical boundary in a direction toward a center of the projected color space gamut.

13. A non-transitory computer-readable storage medium storing a computer-executable program, said computer-executable program being executable by a computer so as to control the computer to execute a color management method for converting a source color in a source device color space into a corresponding destination color in a destination device color space, the method comprising:
    transforming the source color in the source device dependent color space through a transformation sequence into a spectrally-based interim connection space (ICS), so as to obtain a source-side color in the spectrally-based ICS;
    spectrally gamut-mapping the source-side color so as to obtain a destination-side color in the spectrally-based ICS; and
    transforming the destination-side color through a transformation sequence into the corresponding destination color in the destination device-dependent color space;
    wherein said spectral gamut-mapping step comprises:
    first projecting a spectral gamut onto a three-dimensional color space so as to obtain a color space gamut thereof;
    second projecting the source-side color onto the three-dimensional color space so as to obtain a projected source-side color;
    colorimetrically gamut mapping the projected source-side color using the color space gamut so as to obtain a gamut-mapped color space color;
    third projecting the gamut-mapped color space color onto within a numerical boundary of the color space gamut so as to obtain a numerically stable color space color;
    inverting the numerically stable color space color so as to obtain a set of feasible points in the spectral gamut, wherein the set of feasible points in the spectral gamut includes one or more destination-side colors in the spectrally-based ICS that lie inside the spectral gamut and that project to the numerically-stable color space color; and
    choosing one destination-side color from among the one or more destination-side colors in the set of feasible points.

14. The storage medium according to claim 13, wherein in said first projecting step, the color space gamut is pre-computed and is re-used for conversion of multiple ones of source colors into a corresponding number of destination colors.

15. The storage medium according to claim 13, wherein in said inverting step, a gamut section is obtained, wherein the gamut section is defined as a geometric intersection of a linear subspace and a spectral gamut for the destination device.

16. The storage medium according to claim 15, wherein the spectral gamut for the destination device is pre-computed and is re-used for conversion of multiple ones of source colors into a corresponding number of destination colors.

17. The storage medium according to claim 13, wherein in said choosing step, the one destination-side color chosen from among the one or more destination-side colors corresponds to the destination-side color that minimizes an objective function.

18. The storage medium according to claim 13, wherein said third projecting step comprises a radial contraction in which the gamut-mapped color space color is contracted into within the numerical boundary in a direction toward a center of the projected color space gamut.

19. A computer-executable program stored on a non-transitory computer-readable storage medium, said computer-executable program being executable by a computer so as to control the computer to execute a color management method for converting a source color in a source device color space into a corresponding destination color in a destination device color space, the method comprising:
    transforming the source color in the source device dependent color space through a transformation sequence into a spectrally-based interim connection space (ICS), so as to obtain a source-side color in the spectrally-based ICS;
    spectrally gamut-mapping the source-side color so as to obtain a destination-side color in the spectrally-based ICS; and
    transforming the destination-side color through a transformation sequence into the corresponding destination color in the destination device-dependent color space;
    wherein said spectral gamut-mapping step comprises:
    first projecting a spectral gamut onto a three-dimensional color space so as to obtain a color space gamut thereof;
    second projecting the source-side color onto the three-dimensional color space so as to obtain a projected source-side color;
    colorimetrically gamut mapping the projected source-side color using the color space gamut so as to obtain a gamut-mapped color space color;
    third projecting the gamut-mapped color space color onto within a numerical boundary of the color space gamut so as to obtain a numerically stable color space color;
    inverting the numerically stable color space color so as to obtain a set of feasible points in the spectral gamut, wherein the set of feasible points in the spectral gamut includes one or more destination-side colors in the spectrally-based ICS that lie inside the spectral gamut and that project to the numerically-stable color space color; and
    choosing one destination-side color from among the one or more destination-side colors in the set of feasible points.

20. The program according to claim 19, wherein in said first projecting step, the color space gamut is pre-computed and is re-used for conversion of multiple ones of source colors into a corresponding number of destination colors.

21. The program according to claim 19, wherein in said inverting step, a gamut section is obtained, wherein the gamut section is defined as a geometric intersection of a linear subspace and a spectral gamut for the destination device.

22. The program according to claim 21, wherein the spectral gamut for the destination device is pre-computed and is re-used for conversion of multiple ones of source colors into a corresponding number of destination colors.

23. The program according to claim 19, wherein in said choosing step, the one destination-side color chosen from among the one or more destination-side colors corresponds to the destination-side color that minimizes an objective function.

24. The program according to claim 19, wherein said third projecting step comprises a radial contraction in which the gamut-mapped color space color is contracted into within the numerical boundary in a direction toward a center of the projected color space gamut.

25. A color management system that includes a source device, a destination device, and a color management device, wherein the color management device converts a source color in a color space of the source device into a corresponding destination color in a color space of the destination device, the color management device including a processor and a computer-readable memory medium that stores computer-executable code executed by the processor, the code including code for performing a color management method comprising:
    transforming the source color in the source device dependent color space through a transformation sequence into a spectrally-based interim connection space (ICS), so as to obtain a source-side color in the spectrally-based ICS;
spectrally gamut-mapping the source-side color so as to obtain a destination-side color in the spectrally-based ICS; and
transforming the destination-side color through a transformation sequence into the corresponding destination color in the destination device-dependent color space;
wherein said spectral gamut-mapping step comprises:
first projecting a spectral gamut onto a three-dimensional color space so as to obtain a color space gamut thereof;
second projecting the source-side color onto the three-dimensional color space so as to obtain a projected source-side color;
colorimetrically gamut mapping the projected source-side color using the color space gamut so as to obtain a gamut-mapped color space color;
third projecting the gamut-mapped color space color onto within a numerical boundary of the color space gamut so as to obtain a numerically stable color space color;
inverting the numerically stable color space color so as to obtain a set of feasible points in the spectral gamut, wherein the set of feasible points in the spectral gamut includes one or more destination-side colors in the spectrally-based ICS that lie inside the spectral gamut and that project to the numerically-stable color space color; and
choosing one destination-side color from among the one or more destination-side colors in the set of feasible points.

26. The color management system according to claim 25, wherein in said first projecting step, the color space gamut is pre-computed and is re-used for conversion of multiple ones of source colors into a corresponding number of destination colors.

27. The color management system according to claim 25, wherein in said inverting step, a gamut section is obtained, wherein the gamut section is defined as a geometric intersection of a linear subspace and a spectral gamut for the destination device.

28. The color management system according to claim 27, wherein the spectral gamut for the destination device is pre-computed and is re-used for conversion of multiple ones of source colors into a corresponding number of destination colors.

29. The color management system according to claim 25, wherein in said choosing step, the one destination-side color chosen from among the one or more destination-side colors corresponds to the destination-side color that minimizes an objective function.

30. The color management system according to claim 25, wherein said third projecting step comprises a radial contraction in which the gamut-mapped color space color is contracted into within the numerical boundary in a direction toward a center of the projected color space gamut.

* * * * *